No. 693,678. Patented Feb. 18, 1902.
G. M. WILSON.
MACHINE FOR PRODUCING CHLORIN GAS AND CAUSTIC SODA FROM COMMON SALT.
(Application filed Sept. 20, 1901.)
(No Model.) 2 Sheets—Sheet 1.
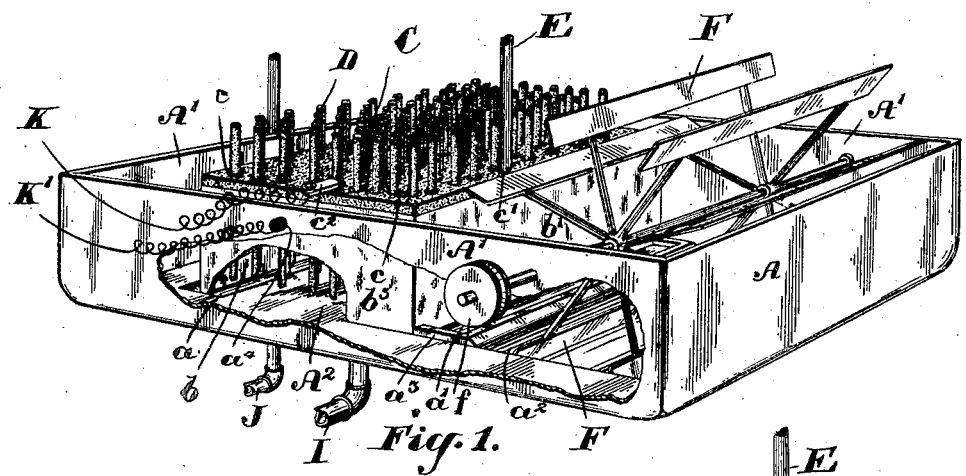
Fig. 1.
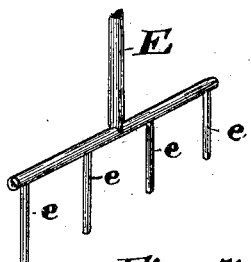
Fig. 6.
Fig. 7.
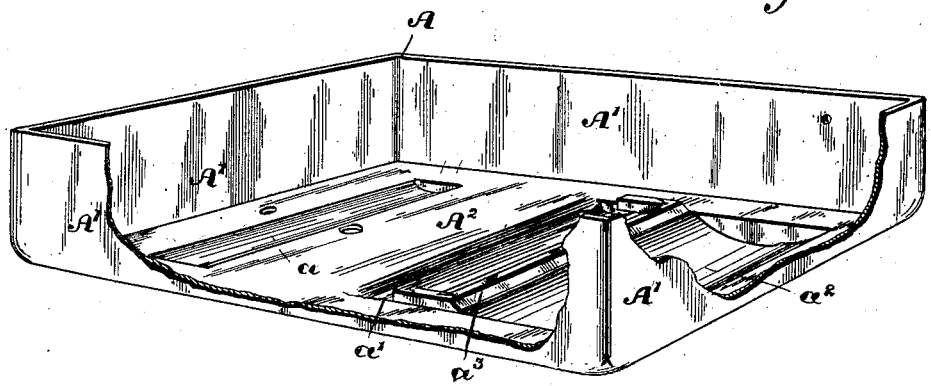
Fig. 2.
Witnesses.
L. Blackmore
F. Hall.
Inventor
George M. Wilson.
by Fetherstonhaugh & Co.
Atty's.

No. 693,678. Patented Feb. 18, 1902.
G. M. WILSON.
MACHINE FOR PRODUCING CHLORIN GAS AND CAUSTIC SODA FROM COMMON SALT.
(Application filed Sept. 20, 1901.)
(No Model.) 2 Sheets—Sheet 2.

Witnesses.
J. Blackmore.
F. Hall.

Inventor.
George M. Wilson
by Fetherstonhaugh & Co.
Atty's.

UNITED STATES PATENT OFFICE.

GEORGE MILES WILSON, OF SAULT STE. MARIE, CANADA.

MACHINE FOR PRODUCING CHLORIN GAS AND CAUSTIC SODA FROM COMMON SALT.

SPECIFICATION forming part of Letters Patent No. 693,678, dated February 18, 1902.

Application filed September 20, 1901. Serial No. 75,990. (No model.)

*To all whom it may concern:*

Be it known that I, GEORGE MILES WILSON, a subject of the King of Great Britain, residing at Sault Ste. Marie, in the county of Algoma, Province of Ontario, Canada, have invented certain new and useful Improvements in Machines for Producing Chlorin Gas and Caustic Soda from Common Salt, of which the following is a specification.

My invention relates to a machine for separating common salt into its constituent parts and producing therefrom caustic soda and chlorin gas; and the object of the invention is to devise a machine which shall be compact, cheap to manufacture, durable, and effective in its operations; and it consists, essentially, of a chamber, preferably rectangular, and an inner cell provided with a carbon cover-plate having a plurality of electrodes protruding through to the interior of the inner cell, and a paddle-wheel to one end of the outer chamber designed to keep in constant motion a substance placed in the bottom of the chamber and cell, and wells in the bottom of the outer chamber, one of which is swept by the paddles of the paddle-wheel and the two remaining wells acting as communicating passages in and out of the inner cell, suitable overflow-pipes being provided in both the inner cell and outer chamber, as also feed-pipes and electric attachments, and the various parts being constructed in detail as hereinafter more particularly described.

Figure 3:
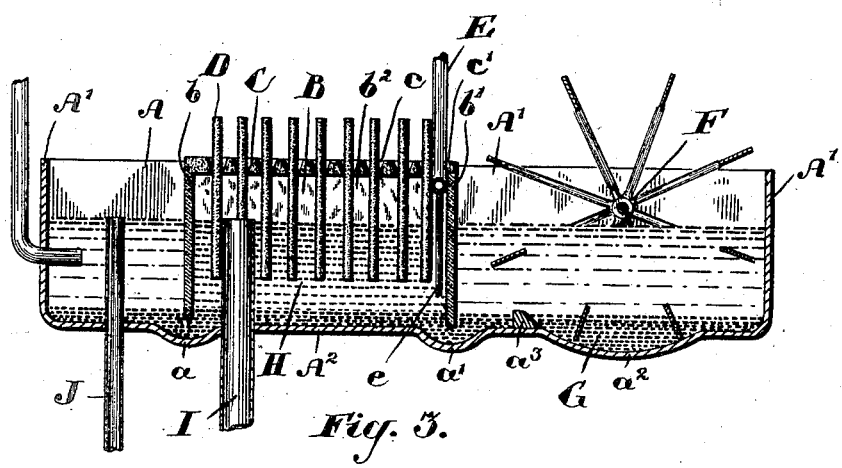
Figure 4:
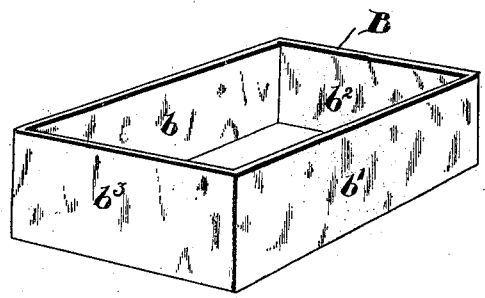
Figure 5:
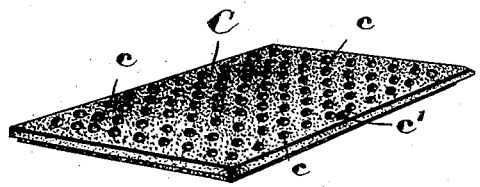

Figure 1 is a perspective view of the complete machine in which the method is performed, a portion of one side being broken away to show the interior. Fig. 2 is a detail of the outside cell partially broken away to show the flooring. Fig. 3 is a sectional view of the device. Fig. 4 is a detail of the electrode-cell. Fig. 5 is a detail of the carbon plate. Fig. 6 is a detail of an electrode. Fig. 7 is a detail of the brine-feed.

Like letters of reference indicate corresponding parts in each figure.

The device used in my method comprises an outer metal cell A and an inner cell B, rectangular in shape. The inner cell B is open at the bottom and is covered at the top by the carbon cover-plate C. The cover-plate C has a multiplicity of perforations $c$, into which are inserted electrodes D. The cover-plate C and the electrodes D are of carbon, while the walls $b$, $b'$, $b^2$, and $b^3$ are of glass or glazed crockery. The inner cell B rests on the bottom of the outer cell A, so that its walls $b$ and $b'$ are centrally located over the wells $a$ and $a'$ in the bottom of the outer cell. A paddle-wheel F, operated by the driving-wheel $f$, is journaled in the metal sides of the outer cell, so that its paddles follow the formation of the bed of the well $a^2$ in the bottom of the outer cell. A feed-pipe E, having at its lower end the minor feed-pipes $e$, is inserted through the cover-plate C near to the side $b'$ of the inner cell. The overflow-pipe I is inserted through the bottom of the outer cell, reaching up into the interior of the inner cell to a suitable height. A second overflow-pipe J is inserted through the bottom of the outer cell outside the inner cell and at the extreme opposite end of the paddle.

The water-supply pipe L is provided to one side of the outer cell.

The electric wires K and K' are attached, respectively, to the cover-plate C and to one of the metal sides of the outer cell.

The operation of my device consists in first pouring into the outer cell a limited quantity of mercury, sufficient to completely cover the bottom of the outer chamber, thereby filling all the wells and also providing a body of mercury in the inner and outer cells at an even level. The mercury does not rise above the top of the guide-wall $a^3$, located between the wells $a'$ and $a^2$. In the next place a quantity of water is fed to the outer cell through the supply-pipe L. The feeding of the water to the outer cell should be continuous, as the overflow-pipe J will keep it at a certain level. It will be seen that the mercury rising above the tops of the wells $a$ and $a'$ will form an impenetrable barrier for the prevention of any lighter substance than itself flowing under the walls $b$ and $b'$ through the wells $a$ and $a'$. Simultaneously with the feeding of the water to the outer cell a solution of salt and water is continuously fed through the pipe E to the inner cell, discharging through the minor pipes $e$ close to the surface of the mercury. The overflow-pipe I regulates the quantity of brine, keeping it on an even level with the water in the outer cell. An electric circuit is formed by charging the wires K and K' with electricity. The wires are suitably connected at their outer ends, and where the break in the circuit apparently occurs in the inner cell the current is drawn from the anode—namely, the cover-plate C and electrodes—to the cathode—the bed of mercury—and thence to the metal sides of the outer cell. The electrodes being immersed in the brine and the latter discharging constantly from the pipes e, the electric current passes through the brine and decomposes and splits up the particles of salt, separating the same into its constituent parts—namely, chlorin gas and sodium. It will be seen that the continuous inflow of brine distributed close to the surface of the mercury and forced thereover keeps constantly a fresh supply of salt between the electrodes and the mercury. The chlorin rises and with the spent brine passes out through the overflow-pipe I. The sodium has an affinity for mercury and is therefore absorbed by the mercury in the inner cell, forming sodium amalgam. At the same time that the electric current is introduced into the wires and is being passed through the brine the paddle-wheel is rotating and sweeping the bed of the well $a^2$, each paddle lifting the mercury over the guide-wall $a^3$, and so into the well $a'$. The operation of the paddles being continuous while the machine is working and the mercury constantly falling into the well $a^2$ is forced forward first through the well $a'$ and then into the inner well and then under the wall of the inner cell through the well $a$, where it reaches the end wall of the outer cell. The mercury reaching this end wall from the constant pressure behind it is forced to the sides and then by the side walls of the outer cell turned in its flow in the direction of the well $a^2$. It will be seen that at no part of this backward flow does the onward flow in the center of the cell interfere with it, the guide-wall $a^3$ preventing such at the only possible point of interference. Thus a steady circulation of the mercury is kept up, and as it has been before explained that the sodium is absorbed by the mercury the latter must carry from the inner cell to the outer cell the sodium decomposed from the salt. As soon as the mercury reaches the outer cell with the sodium the latter becomes dissolved in the pure water over the mercury and is carried away through the overflow-pipe J as a weak solution of caustic soda, the percentage of which is much increased subsequently by the evaporation of the water.

What I claim as my invention is—

1. In a machine for electrically decomposing common salt into its constituent parts, the combination with a rectangular metal chamber open at the top, and having recesses in its bottom for a portion of the width of the chamber, of an inner cell with non-conducting sides and a carbon cover-plate, a plurality of electrodes protruding therethrough, a paddle-wheel journaled in the sides of the outer chamber in proximity to one end of the outer chamber, suitable means of feeding liquids to the chamber and cell, and means for retaining the same at a certain level, as and for the purpose specified.

2. The combination with a rectangular metal chamber open at the top, and having recesses in its bottom, of an inner cell with non-conducting sides and a carbon cover-plate, a plurality of electrodes protruding therethrough, a feed-pipe provided at its lower end with minor distributing-tubes, an overflow-pipe, and means outside the inner cell of circulating a fluid in the bottom of the outer chamber through the inner cell, as and for the purpose specified.

3. The combination with a rectangular metal chamber open at the top, and having a plurality of recesses in the bottom thereof, of an inner cell having non-conducting sides with two of the latter located centrally over parallel recesses in the bottom, a carbon cover-plate, a plurality of electrodes protruding therethrough, a distributing feed-pipe, an overflow-pipe, for the inner cell, a paddle-wheel journaled in the metal sides of the outer chamber and located directly over and in one of the recesses in the bottom, a suitable water-supply pipe, and a discharge-pipe, for the outer chamber, as and for the purpose specified.

4. In combination, an outer metal chamber provided with parallel recesses laterally arranged in its bottom, a paddle-wheel journaled in the sides thereof in proximity to one end of the chamber, a water-supply pipe, an overflow-pipe, an inner cell with non-conducting sides, two of the latter being located centrally over recesses in the bottom of the outer chamber, a carbon cover-plate, a plurality of electrodes protruding therethrough, a feed-pipe and an overflow-pipe, in the inner cell, as and for the purpose specified.

Signed at Sault Ste. Marie the 7th day of August, 1901.

GEORGE MILES WILSON.

Witnesses:
GEO. J. DICKISON,
JAS. C. TOWERS.